US012321664B2

(12) United States Patent
Kumata et al.

(10) Patent No.: US 12,321,664 B2
(45) Date of Patent: Jun. 3, 2025

(54) VOICE CONTROL SYSTEM, VOICE CONTROL METHOD, AND RECORDING MEDIUM RECORDING VOICE CONTROL PROGRAM

(71) Applicant: SHARP KABUSHIKI KAISHA, Sakai (JP)

(72) Inventors: Akihiro Kumata, Sakai (JP); Kazuo Makijima, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 89 days.

(21) Appl. No.: 18/220,813

(22) Filed: Jul. 11, 2023

(65) Prior Publication Data
US 2024/0020088 A1    Jan. 18, 2024

(30) Foreign Application Priority Data

Jul. 13, 2022  (JP) .................................. 2022-112297

(51) Int. Cl.
G06F 3/04847    (2022.01)
G06F 3/04817    (2022.01)
G06F 3/16       (2006.01)

(52) U.S. Cl.
CPC .......... *G06F 3/165* (2013.01); *G06F 3/04817* (2013.01); *G06F 3/04847* (2013.01)

(58) Field of Classification Search
None
See application file for complete search history.

(56) References Cited

U.S. PATENT DOCUMENTS

| | | | |
|---|---|---|---|
| 2009/0316685 A1* | 12/2009 | Mandre | H04L 51/043 370/352 |
| 2011/0256907 A1* | 10/2011 | Lee | H04M 1/27475 455/566 |
| 2021/0377062 A1* | 12/2021 | Stevens | H04L 12/1822 |
| 2022/0070066 A1* | 3/2022 | Tokuchi | H04L 41/22 |
| 2023/0421724 A1* | 12/2023 | Fukai | H04N 7/157 |

FOREIGN PATENT DOCUMENTS

JP    2009-199198 A    9/2009

* cited by examiner

*Primary Examiner* — Tuan S Nguyen
(74) *Attorney, Agent, or Firm* — ScienBiziP, P.C.

(57) ABSTRACT

A voice control system includes a setting processing unit that sets up a conversation group including a plurality of users in a virtual space, and a restriction processing unit that restricts an output of voice which is outside the conversation group to be set by the setting processing unit to a user in the conversation group.

10 Claims, 11 Drawing Sheets

FIG. 3

USER INFORMATION MANAGEMENT TABLE (T1)

| USER NAME | USER ID | USER ICON POSITION | MICROPHONE SETTINGS | SPEAKER SETTINGS |
|---|---|---|---|---|
| A | a001 | p1 | ON | ON |
| B | b002 | p2 | ON | ON |
| C | c003 | p3 | ON | ON |
| D | d004 | p4 | ON | ON |
| E | e005 | p5 | ON | ON |

FIG. 4

GROUP INFORMATION MANAGEMENT TABLE (T2)

| GROUP ID | USER ID |
|---|---|
| g001 | a001, b002, c003 |
| g002 | d004, e005 |

FIG. 5

VOICE CONTROL INFORMATION MANAGEMENT TABLE (T3)

| USER ID | GROUP CONVERSATION | VOICE OF A | VOICE OF B | VOICE OF C | VOICE OF D | VOICE OF E |
|---|---|---|---|---|---|---|
| a001 | ALLOW | – | ○ | ○ | × | × |
| b002 | ALLOW | ○ | – | ○ | × | × |
| c003 | ALLOW | ○ | ○ | – | × | × |
| d004 | NOT ALLOW | ○ | ○ | ○ | – | × |
| e005 | NOT ALLOW | × | × | × | × | – |

VOICE CONTROL SYSTEM, VOICE CONTROL METHOD, AND RECORDING MEDIUM RECORDING VOICE CONTROL PROGRAM

INCORPORATION BY REFERENCE

This application is based upon and claims the benefit of priority from the corresponding Japanese Patent Application No. 2022-112297 filed on Jul. 13, 2022, the entire contents of which are incorporated herein by reference.

BACKGROUND

The present disclosure relates to a voice control system, a voice control method, and a recording medium recording a voice control program for controlling conversation voice in a virtual space.

Conventionally, a system is known in which conversation is enabled among specific users, in a case where a user icon is moved closer to another user icon, or a user icon is moved to a meeting area in a virtual space.

However, in the conventional technique, since a volume of conversation voice changes according to a position of each of a plurality of user icons, for example, in a case where conversation is made in a conversation group including a plurality of users, and a user icon of a user who is outside the conversation group is near a position of a user icon of the conversation group, voice of the user who is outside the conversation group may enter the conversation group, which causes a problem that conversation in the conversation group cannot be made smoothly.

SUMMARY

An object of the present disclosure is to provide a voice control system, a voice control method, and a recording medium recording a voice control program that enable to make conversation in a conversation group smoothly in a virtual space.

A voice control system according to one aspect of the present disclosure includes a setting processing unit and a restriction processing unit. The setting processing unit sets up a conversation group including a plurality of users in a virtual space. The restriction processing unit restricts an output of voice which is outside the conversation group to be set by the setting processing unit to a user in the conversation group.

A voice control method according to another aspect of the present disclosure is a method of causing one or more processors to execute: setting up a conversation group including a plurality of users in a virtual space; and restricting an output of voice which is outside the conversation group to a user in the conversation group.

A recording medium according to another aspect of the present disclosure is a recording medium recording a program for causing one or more processors to execute: setting up a conversation group including a plurality of users in a virtual space; and restricting an output of voice which is outside the conversation group to a user in the conversation group.

The present disclosure can provide a voice control system, a voice control method, and a recording medium recording a voice control program that enable to make conversation in a conversation group smoothly in a virtual space.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 is a diagram illustrating an example of a user information management table according to the embodiment of the present disclosure.

FIG. 4 is a diagram illustrating an example of a group information management table according to the embodiment of the present disclosure.

FIG. 5 is a diagram illustrating an example of a voice control information management table according to the embodiment of the present disclosure.

DETAILED DESCRIPTION

In the following, an embodiment according to the present disclosure is described with reference to the accompanying drawings. Note that, the following embodiment is an example embodying the present disclosure, and does not limit the technical scope of the present disclosure.

A voice control system according to the present disclosure is a system that allows users having each user icon to converse with one another by bringing the user icons close to one another in a virtual space. As an example of the voice control system according to the present disclosure, a conversation system is described as an example in the following embodiment.

The conversation system can be applied, for example, to a Web meeting (online meeting) or the like in which a plurality of users make conversation in a virtual space by utilizing a user terminal such as a laptop computer, a smartphone, and the like, while staying in a different location (such as a meeting room in an office, or a home). The conversation system also includes a conversation server that provides an online meeting service by means of a conversation application, which is a general-purpose software for executing the online meeting, and a management server that provides a management service for managing the online meeting.

Conversation System 100

Figure 1:
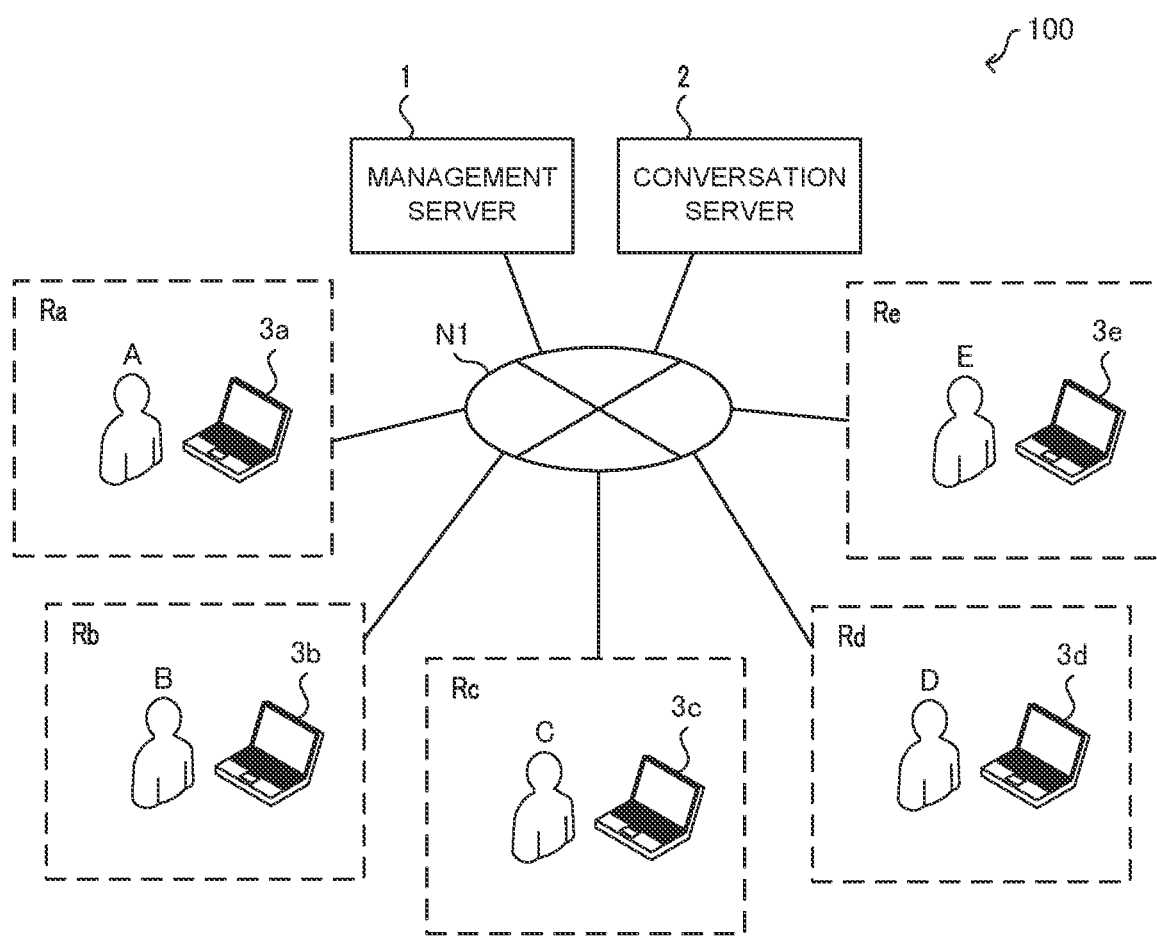
FIG. 1 is a schematic diagram illustrating a schematic configuration of a conversation system according to an embodiment of the present disclosure.

FIG. 1 is a schematic diagram illustrating a schematic configuration of a conversation system 100 according to an embodiment of the present disclosure. The conversation system 100 includes a management server 1, a conversation server 2, and user terminals 3. The conversation system 100 is a system that supports an online meeting in which a plurality of users participate.

FIG. 1 illustrates a home Ra of a user A, a home Rb of a user B, a home Rc of a user C, a home Rd of a user D, and a home Re of a user E. FIG. 1 illustrates an example in which each of the users A to E participates in an online meeting at his/her home. One user terminal 3 owned by each user is disposed at each home.

The conversation system 100 allows a plurality of users to carry out an online meeting in a remote place by executing a conversation application installed in each user terminal 3. The conversation application is a general-purpose software, and a plurality of users participating in the same meeting select the common conversation application.

For example, each of the users A, B, C, D, and E activates the conversation application on his/her user terminal 3a, 3b, 3c, 3d, and 3e.

Note that, the conversation system 100 may be configured in such a way that a microphone and speaker device, a camera, and the like connectable to the user terminal 3 are connected at each location (such as a meeting room and a home), and a voice and a camera image can be bidirectionally communicable. The microphone and speaker device and the camera may be built in the user terminal 3.

Each of the management server 1 and the conversation server 2 is configured of one or more server devices (e.g., cloud servers).

The management server 1, the conversation server 2, and the user terminal 3 are connected to one another via a network N1. The network N1 is a communication network such as the Internet, a LAN, a WAN, or a public telephone line.

Conversation Server 2

Figure 2:
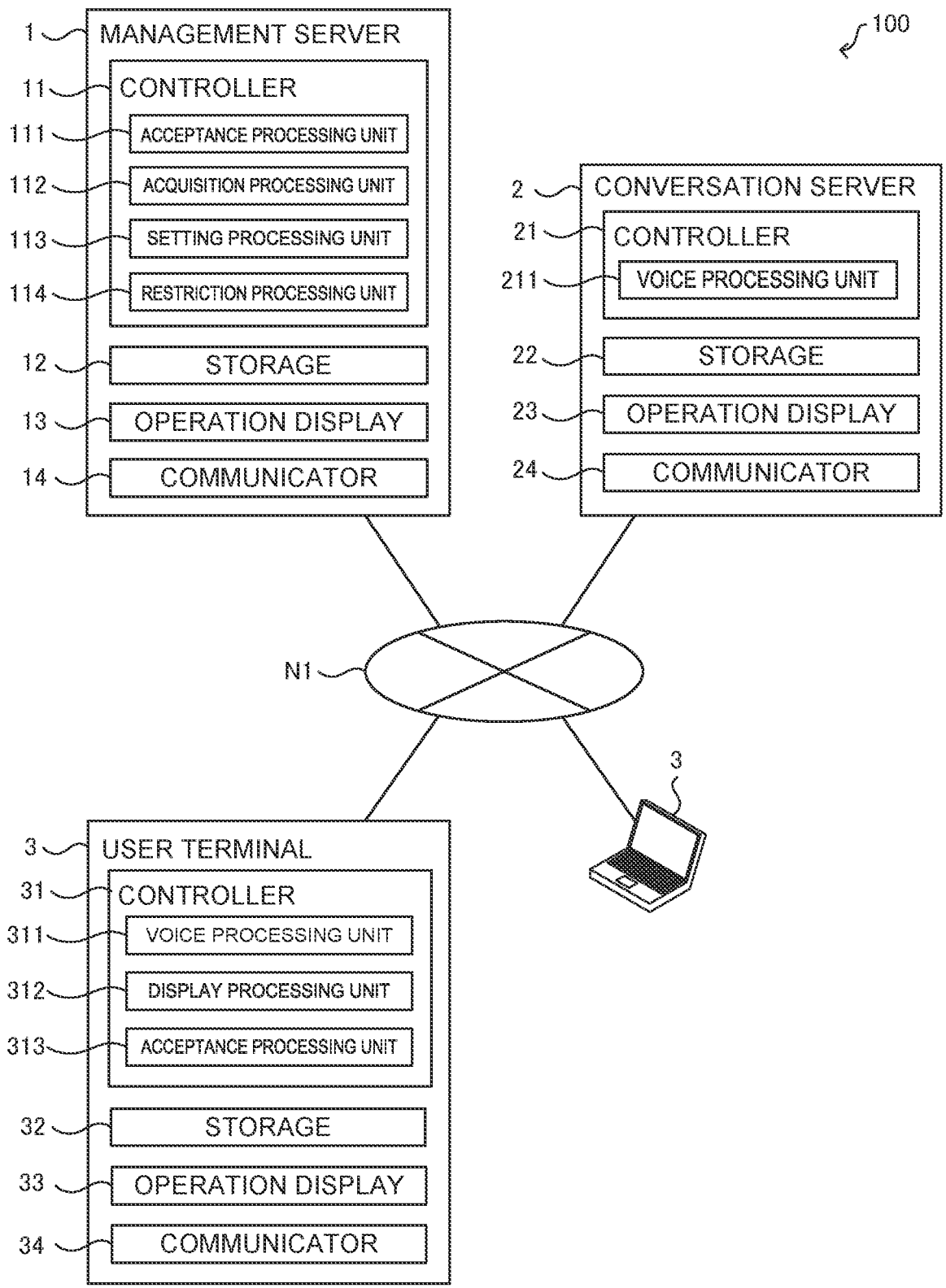
FIG. 2 is a functional block diagram illustrating a configuration of the conversation system according to the embodiment of the present disclosure.

As illustrated in FIG. 2, the conversation server 2 includes a controller 21, a storage 22, an operation display 23, a communicator 24, and the like. The conversation server 2 may be one or more virtual servers (cloud servers), or may be one or more physical servers.

The communicator 24 is a communicator that connects the conversation server 2 to the network N1 in a wired or wireless manner, and performs data communication according to a predetermined communication protocol with another device (e.g., the management server 1, the user terminal 3, or the like) via the network N1.

The operation display 23 is a user interface including: a display, such as a liquid crystal display or an organic EL display, which displays various pieces of information; and an operation acceptor, such as a mouse, a keyboard, or a touch panel, which accepts an operation.

The storage 22 is a non-volatile storage such as a hard disk drive (HDD), a solid state drive (SSD), or a flash memory, which stores various pieces of information. The storage 22 stores a control program such as a conversation control program for causing the controller 21 to execute conversation control processing (see FIG. 10) to be described later. For example, the conversation control program is non-transitorily recorded in a computer-readable recording medium such as a CD, or a DVD, read by a reading device (not illustrated) such as a CD drive or a DVD drive included in the conversation server 2, and stored in the storage 22. Note that, the conversation program may be distributed from a cloud server, and stored in the storage 22.

In addition, an online meeting program for causing the controller 21 to execute an online meeting service is stored in the storage 22. The online meeting program causes the controller 21 to execute the online meeting in response to execution of a conversation application installed in the user terminal 3. It is assumed that the conversation server 2 according to the present embodiment provides an online meeting service of a conversation application, which is one of general-purpose software.

User information (such as a user ID and a password) relating to a user who can utilize the conversation application is stored in the storage 22.

The controller 21 includes a control device such as a CPU, a ROM, and a RAM. The CPU is a processor that executes various arithmetic operations. The ROM stores in advance a control program such as a BIOS and an OS for causing the CPU to execute various arithmetic operations. The RAM stores various pieces of information, and is used as a temporary storage memory (work area) in which the CPU executes various pieces of processing. Further, the controller 21 controls the conversation server 2 by causing the CPU to execute various control programs stored in advance in the ROM or the storage 22.

Specifically, the controller 21 includes various processing units such as a voice processing unit 211. Note that, the controller 21 functions as the various processing units by executing various pieces of processing in accordance with the conversation control program. Also, some or all of the processing units included in the controller 21 may be constituted of an electronic circuit. Note that, the conversation control program may be a program for causing a plurality of processors to function as the various processing units.

The voice processing unit 211 performs an online meeting by causing the controller 21 to execute a conversation application on each of the plurality of user terminals 3. Specifically, the voice processing unit 211 starts an online meeting, based on login information to be acquired from the user terminal 3. For example, when the user A activates the conversation application on the user terminal 3a, and performs a login operation, the user terminal 3a transmits login information including a user ID and a password to the conversation server 2. When the voice processing unit 211 acquires the login information from the user terminal 3a, and authenticates the user A, the online meeting is started.

Further, for example, when the user A finishes the conversation application (finishes the online meeting) on the user terminal 3a, the user terminal 3a transmits a finishing request to the conversation server 2. When the voice processing unit 211 acquires the finishing request from the user terminal 3a, the voice processing unit 211 finishes (logs off) the online meeting.

Each of the users A, B, C, D, and E who wishes to participate in the online meeting performs an operating of logging in the conversation application on his/her user terminal 3a, 3b, 3c, 3d, 3e. The user who has logged in the conversation application, and has been authenticated is enabled to converse with another user by operating his/her user icon in a virtual space (virtual meeting room) to be set by the conversation application. For example, when a distance between a plurality of user icons in a virtual space becomes less than a predetermined distance, the voice processing unit 211 starts transmitting and receiving a voice among a plurality of user terminals 3 associated with the plurality of user icons, thereby enabling conversation among a plurality of users.

User Terminal 3

As illustrated in FIG. 2, the user terminal 3 includes a controller 31, a storage 32, an operation display 33, a communicator 34, and the like. The user terminal 3 is an information processing device such as, for example, a laptop computer, a smartphone, or a tablet terminal. Each user terminal 3 may have the same configuration.

The communicator 34 is a communicator that connects the user terminal 3 to the network N1 in a wired or wireless manner, and performs data communication according to a predetermined communication protocol with another device (e.g., the management server 1 or the communication server 2) via the network N1.

The operation display 33 is a user interface including: a display such as a liquid crystal display or an organic EL display, which displays various pieces of information; and an operation acceptor such as a mouse, a keyboard, or a touch panel, which accepts an operation. The operation display 33 accepts a user operation.

The storage 32 is a non-volatile storage such as a HDD, a SSD, or a flash memory, which stores various pieces of information. The storage 32 stores a control program such as a conversation control program for causing the controller 31 to execute conversation control processing (see FIG. 10) to be described later. For example, the conversation control program is non-transitorily recorded in a computer-readable recording medium such as a CD or a DVD, read by a reading device (not illustrated) such as a CD drive or a DVD drive included in the user terminal 3, and stored in the storage 32. Note that, the conversation control program may be distributed from a cloud server, and stored in the storage 32.

Also, one or more conversation applications for providing an online meeting service are installed in the storage 32.

The controller 31 includes a control device such as a CPU, a ROM, and a RAM. The CPU is a processor that executes various arithmetic operations. The ROM stores in advance a control program such as a BIOS and an OS for causing the CPU to execute various pieces of processing. The RAM stores various pieces of information, and is used as a temporary storage memory (work area) for various pieces of processing to be executed by the CPU. Further, the controller 31 controls the user terminal 3 by causing the CPU to execute various control programs stored in advance in the ROM or the storage 32. The controller 31 also functions as a processing unit that executes the conversation application.

Specifically, the controller 31 includes various processing units such as a voice processing unit 311, a display processing unit 312, and an acceptance processing unit 313. Note that, the controller 31 functions as the various processing units by causing the CPU to execute various pieces of processing according to the control program. In addition, some or all of the processing units included in the controller 31 may be constituted of an electronic circuit. Note that, the control program may be a program for causing a plurality of processors to function as the various processing units.

Figure 6:
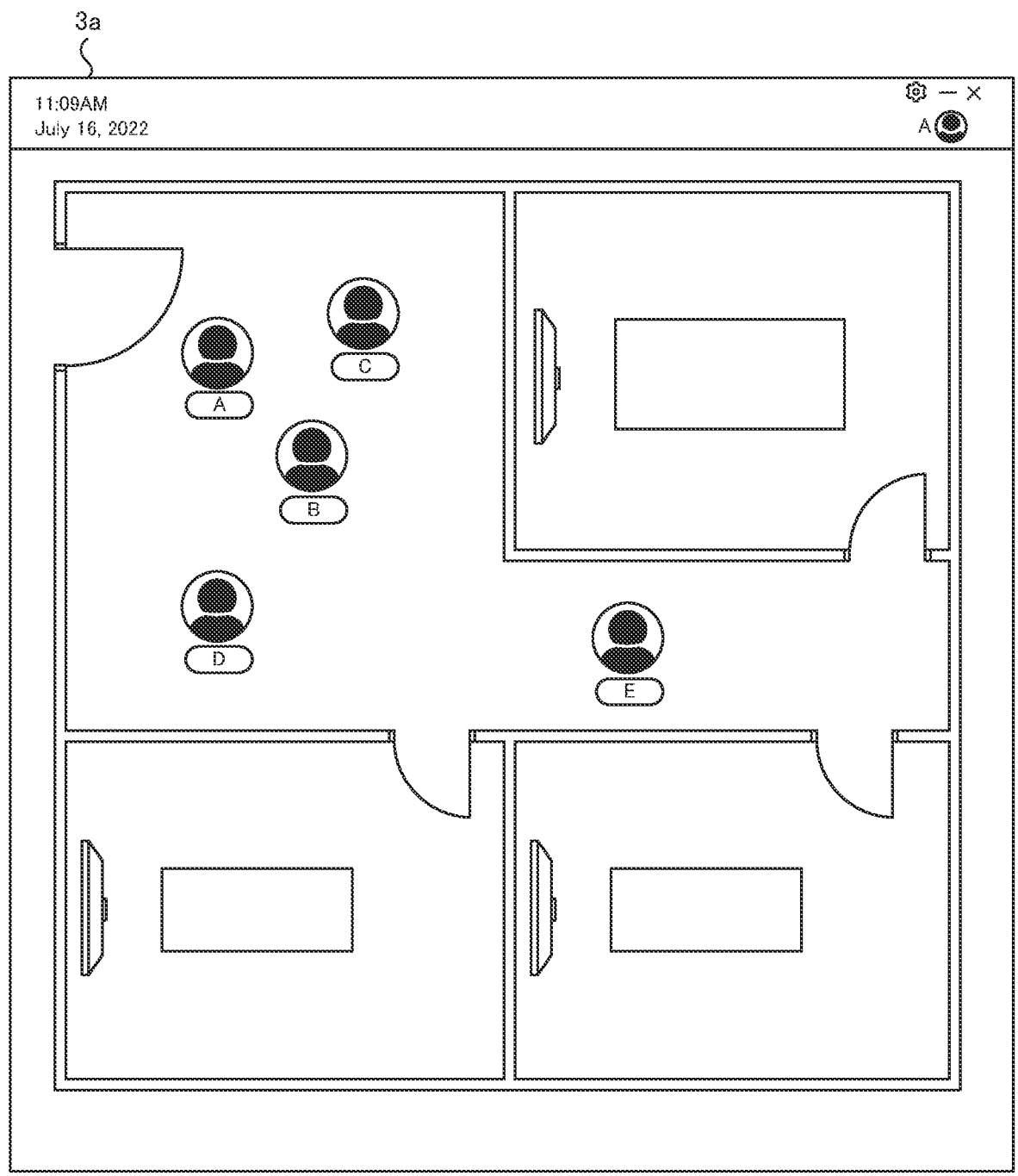
FIG. 6 is a diagram illustrating an example of a conversation screen to be displayed on a user terminal according to the embodiment of the present disclosure.

The voice processing unit 311 executes various pieces of processing relating to the online meeting according to a conversation application. Specifically, when the voice processing unit 311 accepts an operation (login operation) of activating the conversation application by the user, the voice processing unit 311 transmits a start request to the conversation server 2. When the conversation server 2 authenticates the start request, the voice processing unit 311 starts the online meeting by displaying a conversation screen on the user terminal 3. FIG. 6 illustrates an example of the conversation screen associated with a conversation application (online meeting service).

As illustrated in FIG. 6, the display processing unit 312 displays a virtual space (virtual meeting room) on the conversation screen. The display processing unit 312 also displays a user icon that can identify a user in the virtual space. The user icon includes a user name, a user photo, a face image such as an illustration, and the like. The display processing unit 312 may also display, on a user icon, information (such as a microphone icon, and a speaker icon) indicating a setting state of a microphone and a speaker on the user terminal 3. The example illustrated in FIG. 6 illustrates a state in which the users A to E have logged in the conversation application.

The display processing unit 312 displays the conversation screen on the operation display 33 in response to an instruction from the management server 1. Each of the users A to E can view the conversation screen illustrated in FIG. 6 on their user terminals 3a to 3e.

The acceptance processing unit 313 accepts various operations from the user. For example, the acceptance processing unit 313 accepts an operation of moving a user icon from the user in the virtual space included in the conversation screen (see FIG. 6) to be displayed on the operation display 33. The acceptance processing unit 313 outputs information on the accepted user operation to the management server 1.

When the acceptance processing unit 313 accepts the operation of moving the user icon, the display processing unit 312 moves and displays a position of the user icon on the conversation screen. The user can move his/her user icon to a desired position on the conversation screen by a drag-and-drop operation or the like.

Further, in a case where a distance between two adjacent user icons is less than a predetermined distance, the voice processing unit 311 transmits and receives conversation voice via the conversation server 2. For example, in a case where a distance between the user icon of the user A and the user icon of the user B is less than a predetermined distance, when the voice processing unit 311 of the user terminal 3a of the user A acquires a speech sound of the user A through the microphone, the voice processing unit 311 transmits the speech sound to the conversation server 2, and the conversation server 2 transmits the speech sound of the user A to the user terminal 3b of the user B, and the voice processing unit 311 of the user terminal 3b outputs the speech sound of the user A through the speaker. Also, when the voice processing unit 311 of the user terminal 3b of the user B acquires a speech sound of the user B through the microphone, the voice processing unit 311 transmits the speech sound to the conversation server 2, and the conversation server 2 transmits the speech sound of the user B to the user terminal 3a of the user A, and the voice processing unit 311 of the user terminal 3a outputs the speech sound of the user B from the speaker. In this way, the user A and the user B can make conversation (online meeting).

Likewise, in a case where the user icon of the user C is located at a position away from each of the user icon of the user A and the user icon of the user B by a distance less than a predetermined distance, the voice processing unit 311 of the user terminal 3c of the user C transmits and receives speech sounds of the users A, B, and C. This enables conversation among three persons, namely, among the user A, the user B, and the user C.

When the voice processing unit 311 accepts an operation (finishing operation) of finishing the conversation application by the user, the voice processing unit 311 transmits a finishing request to the conversation server 2. When the conversation server 2 authenticates the finishing request, the voice processing unit 311 finishes the online meeting on the user terminal 3.

Each of the users participating in the online meeting starts the online meeting by activating the conversation application on his/her user terminal 3. Each user also finishes the online meeting by finishing the conversation application on his/her user terminal 3.

Management Server 1

As illustrated in FIG. 2, the management server 1 includes a controller 11, a storage 12, an operation display 13, a communicator 14, and the like. The management server 1 may be one or more virtual servers (cloud servers), or one or more physical servers.

The communicator 14 is a communicator that connects the management server 1 to the network N1 in a wired or wireless manner, and performs data communication according to a predetermined communication protocol with another device (e.g., the conversation server 2, the user terminal 3, or the like) via the network N1.

The operation display 13 is a user interface including: a display, such as a liquid crystal display or an organic EL display, which displays various pieces of information; and an operation acceptor, such as a mouse, a keyboard, or a touch panel, which accepts an operation.

The storage 12 is a non-volatile storage such as a HDD, a SSD, or a flash memory, which stores various pieces of information. The storage 12 stores a control program such as a conversation control program for causing the controller 11 to execute conversation control processing (see FIG. 10) to be described later. For example, the conversation control program is non-transitorily recorded in a computer-readable recording medium such as a CD or a DVD, read by a reading device (not illustrated) such as a CD drive or a DVD drive included in the management server 1, and stored in the storage 12. Note that, the conversation control program may be distributed from a cloud server, and stored in the storage 12.

In addition, the storage 12 stores a management table including various pieces of information. Specifically, the storage 12 stores data such as a user information management table T1 (see FIG. 3) that manages information on a user who has logged in the conversation application, a group information management table T2 (see FIG. 4) that manages information on a conversation group, and a voice control information management table T3 (see FIG. 5) that manages control information on a voice of each user who has logged in the conversation application.

As illustrated in FIG. 3, the user information management table T1 registers information such as a user name, a user ID, a user icon position, microphone settings, and speaker settings of a user who is logging in the conversation application. The user name and the user ID are utilized as login information for the conversation application. The user icon position is information indicating a position of a user icon in a virtual space. For example, when the user A logs in the conversation application, a conversation screen is displayed on the user terminal 3a, and the user icon of the user A is displayed in a virtual space on the conversation screen (see FIG. 6 and the like). In addition, the user icon of each of a plurality of users who have logged in is displayed on the conversation screen. FIG. 6 illustrates a conversation screen of the user terminal 3a of the user A. Herein, the user icon of each of the users A to E is displayed. The controller 11 acquires a position of a user icon in the virtual space, and registers the position in the user information management table T1.

The microphone settings and the speaker settings are pieces of information indicating a setting state of a microphone and a speaker on the user terminal 3. For example, when the user sets the microphone and the speaker to an ON state, "ON" is registered in the microphone settings and the speaker settings in the user information management table T1. Further, for example, when the user sets the microphone and the speaker to an OFF state (mute), "OFF" is registered in the microphone settings and the speaker settings in the user information management table T 1.

As illustrated in FIG. 4, the group information management table T2 includes information such as a group ID relating to a conversation group, and a user ID. In a case where a predetermined condition to be described later is satisfied, the controller 11 sets up a conversation group including a plurality of specific users among a plurality of users who have logged in the conversation application. The group ID is identification information of the conversation group. The user ID is identification information for each of a plurality of users included in the conversation group. For example, the user A, the user B, and the user C are included in a conversation group whose group ID is "g001" (see FIG. 8), and the user D and the user E is included in a conversation group whose group ID is "g002" (see FIG. 11).

As illustrated in FIG. 5, the voice control information management table T3 includes a user ID, group conversation, and voice control information on each user. The controller 11 registers voice control information on each user, based on setting information of the conversation group. The voice control information management table T3 in FIG. 5 indicates an example of voice control information associated with a conversation group whose group ID is "g001" (see FIG. 8). Specifically, in a case where a conversation group of the user A, the user B, and the user C is set up, the controller 11 sets group conversation of each of the user A, the user B, and the user C to "allow", and sets group conversation of each of the user D and the user E outside the conversation group to "not allow". Also, the controller 11 permits (registers "○") an output of a speech sound of the user B and an output of a speech sound of the user C to the user A (user terminal 3a) (user ID "a001"), and prohibits (registers "x") an output of a speech sound of the user D and an output of a speech sound of the user E. This allows the user A to hear the speech sound of the user B and the speech sound of the user C in the conversation group, but does not allow to hear the speech sound of the user D and the speech sound of the user E.

Likewise, the controller 11 permits (registers "○") an output of a speech sound of the user A and an output of a speech sound of the user C to the user B (user terminal 3b) (user ID "b002"), and prohibits (registers "x") an output of a speech sound of the user D and an output of a speech sound of the user E. This allows the user B to hear the speech sound of the user A and the speech sound of the user C in the conversation group, but does not allow to hear the speech sound of the user D and the speech sound of the user E.

In contrast, the controller 11 permits (registers "O") an output of the speech sound of the user A, an output of the speech sound of the user B, and an output of the speech sound of the user C to the user D (user terminal 3d) (user ID "d004"). This allows the user D to hear the speech sound of the user A, the speech sound of the user B, and the speech sound of the user C outside the conversation group, but does not allow the user A, the user B, and the user C in the conversation group to hear the speech sound of himself/herself (user D).

Note that, since the position of the user icon of the user E is away from the position of the user icon of each of the users A to D by a predetermined distance or more, the controller 11 prohibits (registers "x") the user E (user terminal 3e) (user ID "e005") from transmitting and receiving a speech sound to and from another user.

Some or all of the user information management table T1, the group information management table T2, and the voice control information management table T3 may be stored in another server.

The controller 11 includes a control device such as a CPU, a ROM, and a RAM. The CPU is a processor that executes various arithmetic operations. The ROM stores in advance a control program such as a BIOS and an OS for causing the CPU to execute various arithmetic operations. The RAM stores various pieces of information, and is used as a temporary storage memory (work area) in which the CPU executes various pieces of processing. The controller 11 also controls the management server 1 by causing the CPU to execute various control programs stored in advance in the ROM or the storage 12.

Specifically, the controller 11 includes various processing units such as an acceptance processing unit 111, an acquisition processing unit 112, a setting processing unit 113, and a restriction processing unit 114. Note that, the controller 11 functions as the various processing units by executing various pieces of processing according to the conversation control program. Also, some or all of the processing units included in the controller 11 may be constituted of an electronic circuit. Note that, the conversation control program may be a program for causing a plurality of processors to function as the various processing units.

The controller 11 acquires user information (user registration information) relating to an authenticated user, based on a login operation of a user, and registers the user information in the user information management table T1 (see FIG. 3).

The acceptance processing unit 111 accepts an operation of moving a user icon in the virtual space from the user. For example, when the user A performs an operation (drag-and-drop operation) of moving his/her user icon on a conversation screen of the user terminal 3a illustrated in FIG. 6, the acceptance processing unit 111 accepts the moving operation from the user terminal 3a. Note that, the acceptance processing unit 111 may be able to accept a moving operation of a user icon in the virtual space only from the user associated with the user icon, or may be able to accept a moving operation of all user icons from a specific user (administrator).

The acquisition processing unit 112 acquires a position of a user icon in the virtual space. In the example illustrated in FIG. 6, the acquisition processing unit 112 acquires a position of each of the users A to E in the virtual space. Specifically, the acquisition processing unit 112 acquires user icon positions p1 to p5 of each of the users A to E in the virtual space. Also, the acquisition processing unit 112 acquires, as a user icon position of a user, a position specified by each of the users in the virtual space on the conversation screen of the user terminal 3. When the acquisition processing unit 112 acquires the user icon positions p1 to p5, the acquisition processing unit 112 registers the position information in the user information management table T1 (see FIG. 3). In a case where a distance between a plurality of user icons is less than a predetermined distance, users having the plurality of user icons can converse with one another.

The setting processing unit 113 sets up a conversation group including a plurality of users in the virtual space. Specifically, in a case where a distance of each of a plurality of user icons associated with a plurality of users is less than a predetermined distance, and a request operation of requesting grouping is accepted from at least one of the plurality of users, the setting processing unit 113 sets up a conversation group including the plurality of users.

Figure 7:
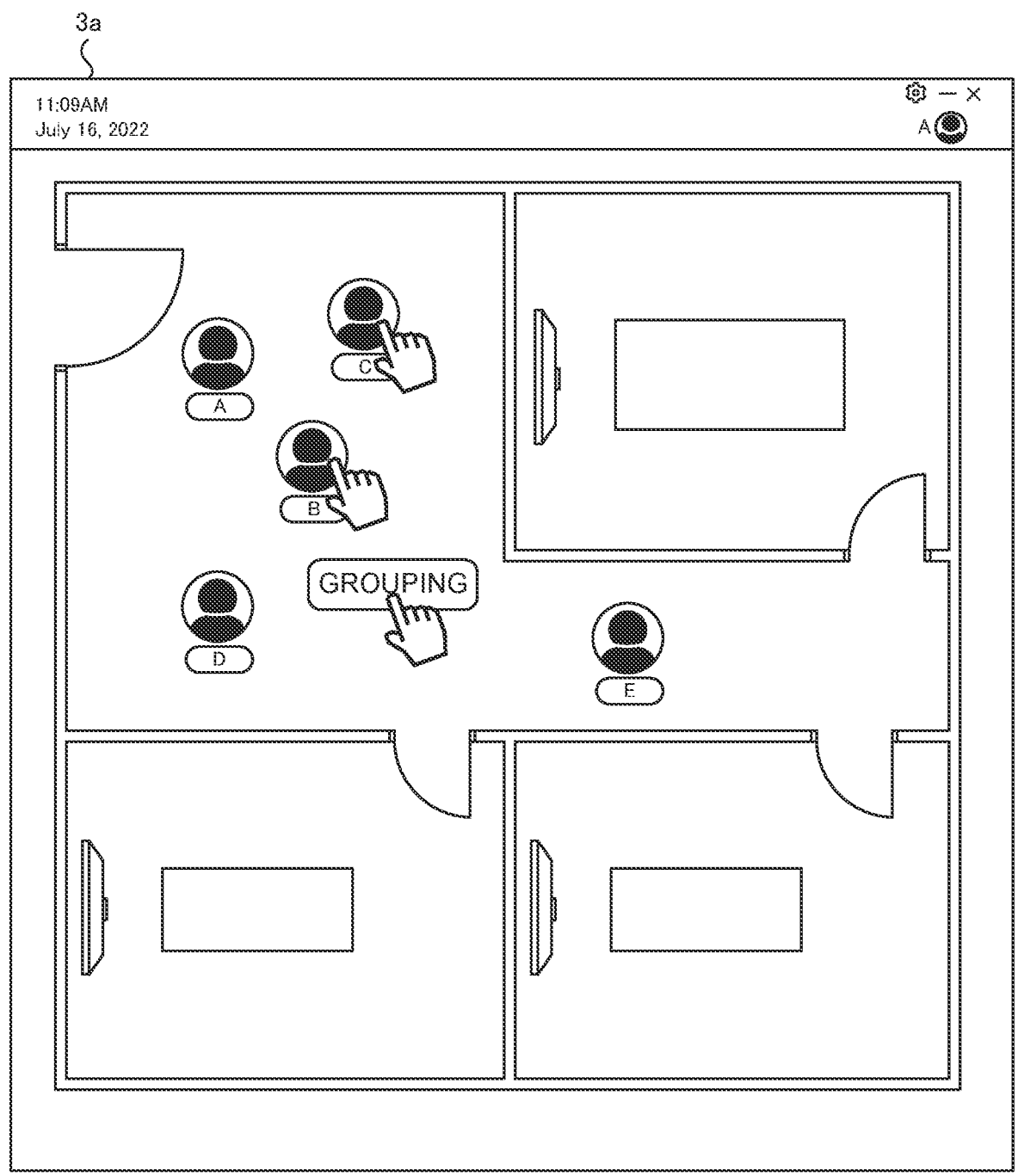
FIG. 7 is a diagram illustrating an example of a conversation screen to be displayed on the user terminal according to the embodiment of the present disclosure.

For example, as illustrated in FIG. 7, in a case where the user A, the user B, and the user C converse with one another among the three persons, the user A, the user B, and the user C bring their user icons close to one another in such a way that a distance to the other user icon becomes less than a predetermined distance. Then, for example, the user A selects the user icon of the user B, and the user icon of the user C. The display processing unit 312 of the user terminal 3a of the user A displays an input screen (e.g., a "grouping" button in FIG. 7) for inputting the request operation.

In a case where the setting processing unit 113 accepts an operation of inputting the request operation from the user A on the conversation screen, specifically, in a case where the user A selects the user icon of the user B and the user icon of the user C, and presses the "grouping" button, the setting processing unit 113 sets up a conversation group including the user A, the user B, and the user C. After setting up the conversation group, the setting processing unit 113 registers, in the group information management table T2 (see FIG. 4), the user ID of the user included in the conversation group. Herein, the setting processing unit 113 registers the user IDs of the user A, the user B, and the user C in association with the any group ID "g001" (see FIG. 4).

In addition, the setting processing unit 113 displays the conversation group to be identifiable on the conversation screen of each user terminal 3. For example, as illustrated in FIG. 8, the setting processing unit 113 displays, on the conversation screen, a frame image (dotted circle in FIG. 8) surrounding the user icons of the user A, the user B, and the user C included in the conversation group.

As another embodiment, the setting processing unit 113 may set up a conversation group including a plurality of users, in a case where a distance between each of a plurality of user icons is less than a predetermined distance, and attribute information of each of the plurality of users satisfies a predetermined condition. The attribute information includes, for example, at least one of a conversation status of a user, schedule information of a user, and setting information on a microphone and a speaker of the user terminal 3.

Figure 8:
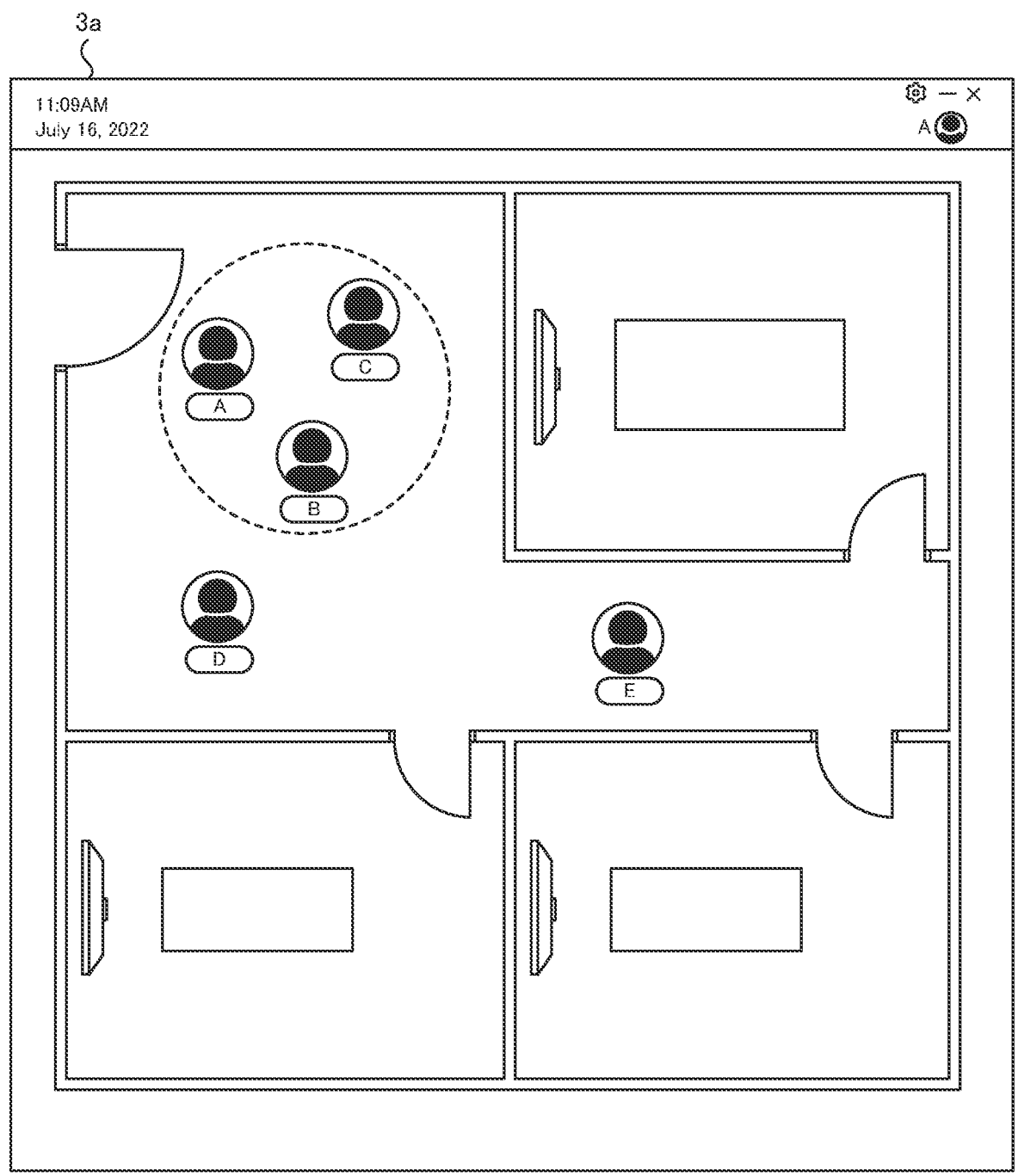
FIG. 8 is a diagram illustrating an example of a conversation screen to be displayed on the user terminal according to the embodiment of the present disclosure.

For example, as illustrated in FIG. 8, in a case where a distance between user icons of each of the user A, the user B, and the user C is less than a predetermined distance, and each of the user A, the user B, and the user C is not in conversation with another user, the setting processing unit 113 sets up a conversation group including the user A, the user B, and the user C.

Figure 9:
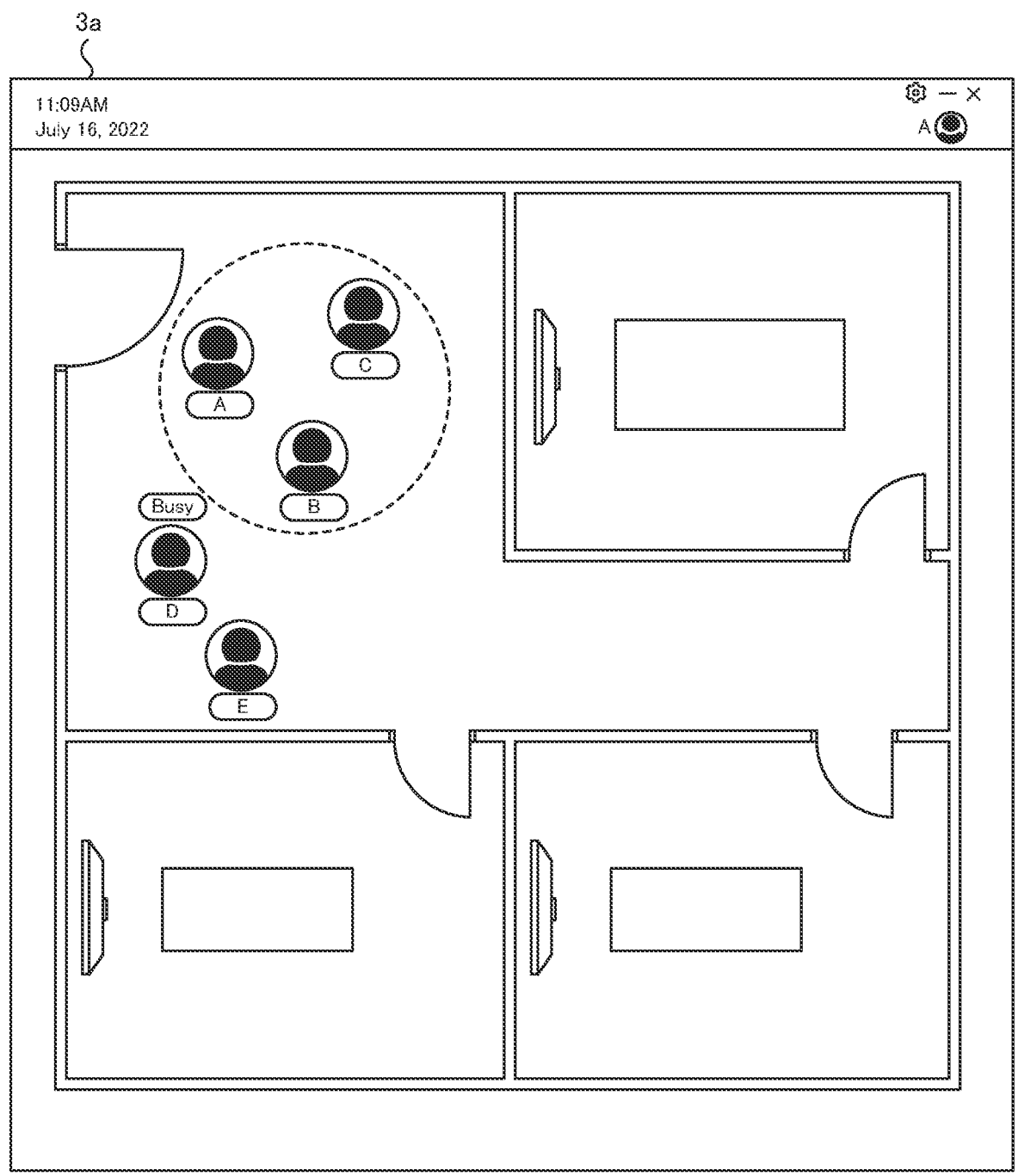
FIG. 9 is a diagram illustrating an example of a conversation screen to be displayed on the user terminal according to the embodiment of the present disclosure.

Further, as illustrated in FIG. 9, for example, in a case where a distance between user icons of each of the user A, the user B, the user C, and the user D is less than a predetermined distance, each of the user A, the user B, and the user C is not in conversation with another user, and the user D is in conversation with the other user E, the setting processing unit 113 sets up a conversation group including the user A, the user B, and the user C, and excludes the user D from the conversation group.

The setting processing unit 113 may also determine whether conversation is in progress, based on a setting state (such as "ON", "OFF", or "mute") of the microphone and the speaker of the user terminal 3. For example, in a case where a distance between user icons of each of the user A, the user B, and the user C is less than a predetermined distance, the microphone and the speaker of the user terminal 3*a* of the user A and the user terminal 3*b* of the user B are in an ON state, and the microphone and the speaker of the user terminal 3*c* of the user C are in an OFF state, the setting processing unit 113 sets up a conversation group including the user A and the user B, and excludes the user C from the conversation group.

In this way, the setting processing unit 113 may set up a conversation group, based on a selection operation by the user, or may set up a conversation group, based on attribute information of the user. The setting processing unit 113 may also set up a conversation group, in a case where a distance between a plurality of user icons is less than a predetermined distance, and in a case where associated users have conversed with one another for a predetermined time or longer, or in a case where the associated users have performed a screen sharing operation.

The restriction processing unit 114 restricts an output of voice from outside the conversation group to be set by the setting processing unit 113 to a user in the conversation group. Specifically, the restriction processing unit 114 permits an output of voice in the conversation group on the user terminal 3 of each of a plurality of users included in the conversation group, while prohibiting an output of voice from outside the conversation group on each of the user terminals 3. For example, the restriction processing unit 114 permits an output of voice in the conversation group on the user terminals 3*a*, 3*b*, and 3*c* of the users A, B, and C included in the conversation group, while prohibiting an output of voice from outside the conversation group on the user terminals 3*a*, 3*b*, and 3*c*. The restriction processing unit 114 registers voice control information for each user in the voice control information management table T3 (see FIG. 5).

This allows, for example, the users A, B, and C in the conversation group to converse with one another by the user terminals 3*a*, 3*b*, and 3*c*, and speech sounds of the users D and E outside the conversation group are not output from the user terminals 3*a*, 3*b*, and 3*c* (see FIG. 5).

The restriction processing unit 114 also permits an output of voice in the conversation group on the user terminal 3 of a user who is not included in the conversation group, and who is associated with a user icon whose distance from the conversation group is less than a predetermined distance. For example, the restriction processing unit 114 permits an output of voice in the conversation group on the user terminal 3*d* of the user D, who is a user not included in the conversation group including the users A, B, and C, and who is associated with a user icon whose distance from the conversation group is less than a predetermined distance. This allows, for example, the user D to hear the speech sounds of the users A, B and C in the conversation group on the user terminal 3*d*. This makes it easy for the user D to participate in conversation of the users A, B, and C. Herein, in a case where the user D requests to participate in the conversation group, the setting processing unit 113 may inquire one or more users in the conversation group whether the user D is allowed to participate in. Then, in a case where the user D is permitted to participate in the conversation group, the setting processing unit 113 may add the user D to the conversation group. This allows the users A, B, C, and D to converse with one another.

Conversation Control Processing

Figure 10:
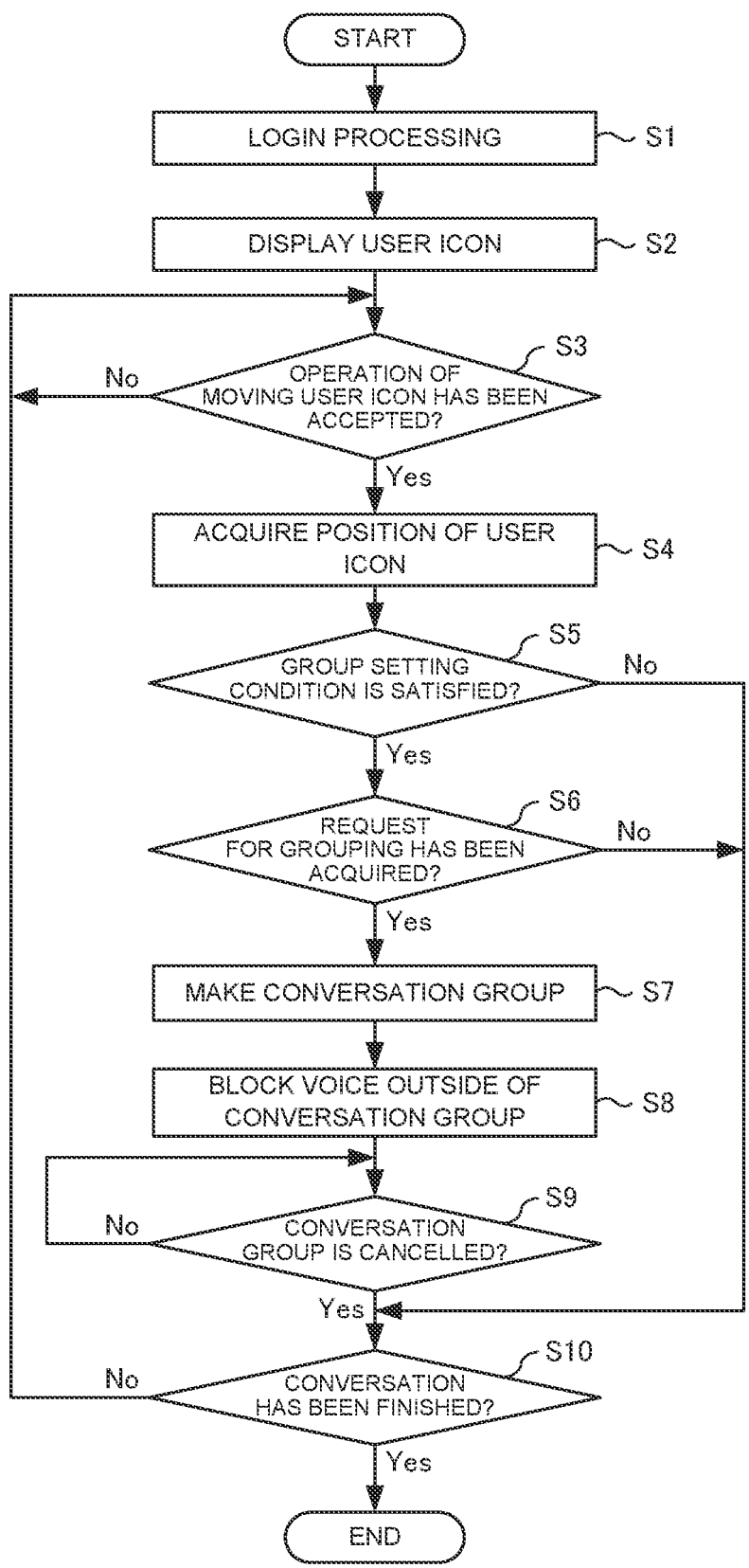
FIG. 10 is a flowchart illustrating an example of a procedure of conversation control processing to be performed by the conversation system according to the embodiment of the present disclosure.

Hereinafter, an example of a procedure of conversation control processing to be executed in the conversation system 100 is described with reference to FIG. 10.

Note that, the present disclosure may be regarded as a conversation control method (an example of a control method according to the present disclosure) in which one or more steps included in the conversation control processing are performed. Also, one or more steps included in the conversation control processing described herein may be omitted as necessary. Also, steps in the conversation control processing may be performed in a different order to the extent that a similar advantageous effect is generated.

Further, herein, a case is described by an example in which each controller of the management server 1, the conversation server 2, and the user terminal 3 performs each step in the conversation control processing, but in another embodiment, one or more processors may perform steps in the conversation control processing in a distributed manner.

First, in step S1, the controller 21 of the conversation server 2 executes login processing of a conversation application. Specifically, when a user activates a conversation application on the user terminal 3, and performs a login operation, the controller 21 executes login processing (authentication processing).

Next, in step S2, the controller 31 of the user terminal 3 displays a conversation screen of the conversation application on the operation display 33, displays a virtual space (virtual meeting room) on the conversation screen, and also displays a user icon of a login user in the virtual space (see FIG. 6). Note that, the controller 31 may display a user icon at a predetermined position (initial setting position) that is set in advance immediately after login.

Next, in step S3, the controller 31 determines whether a moving operation of a user icon has been accepted from the user on the conversation screen. When the controller 31 determines that the moving operation has been accepted from the user (S3: Yes), the controller 31 shifts the processing to step S4. The controller 31 waits until the moving operation is accepted from the user (S3: No).

In step S4, the controller 11 of the management server 1 acquires a position of the user icon. Specifically, the controller 11 acquires a position of the user icon in the virtual space, based on the moving operation of the user icon by the user on the conversation screen.

Next, in step S5, the controller 11 determines whether a plurality of users satisfy a setting condition of a conversation group. For example, the controller 11 determines whether a distance of each of a plurality of user icons associated with a plurality of users is less than a predetermined distance. Also, for example, the controller 11 determines whether attribute information (such as a conversation status) of each of the plurality of users satisfies a predetermined condition. When the controller 11 determines that the plurality of users satisfy the setting condition of the conversation group (S5: Yes), the controller 11 shifts the processing to step S6. On the other hand, when the controller 11 determines that the plurality of users do not satisfy the setting condition of the conversation group (S5: No), the controller 11 shifts the processing to step S10.

In step S6, the controller 11 determines whether a request operation of requesting grouping has been accepted from the user. For example, when the user A presses the "grouping" button on the conversation screen illustrated in FIG. 7, the controller 11 determines that the request operation has been accepted. When the controller 11 determines that the request operation has been accepted (S6: Yes), the controller 11 shifts the processing to step S7. On the other hand, when the controller 11 determines that the request operation has not been accepted (S6: No), the controller 11 shifts the processing to step S10.

In step S7, the controller 11 sets up a conversation group including a plurality of users. For example, as illustrated in FIG. 8, in a case where a distance between user icons of each of the user A, the user B, and the user C is less than a predetermined distance, and each of the user A, the user B, and the user C is not in conversation with another user, the controller 11 sets up a conversation group including the user A, the user B, and the user C.

Further, as illustrated in FIG. 9, for example, in a case where a distance between user icons of each of the user A, the user B, the user C, and the user D is less than a predetermined distance, and each of the user A, the user B, and the user C is not in conversation with another user, and the user D is in conversation with another user E, the controller 11 sets up a conversation group including the user A, the user B, and the user C, and excludes the user D from the conversation group.

In step S8, the controller 11 blocks voice which is outside the conversation group. Specifically, the controller 11 prohibits an output of voice which is outside the conversation group to the users in the conversation group. For example, the controller 11 permits an output of voice in the conversation group on the user terminals 3a, 3b, and 3c of each of the users A, B, and C included in the conversation group, while prohibiting an output of voice which is outside the conversation group on the user terminals 3a, 3b, and 3c. The controller 11 registers voice control information of each user in the voice control information management table T3 (see FIG. 5).

The controller 11 also permits an output of voice in the conversation group on the user terminal 3 of a user who is not included in the conversation group, and who is associated with a user icon whose distance from the conversation group is less than a predetermined distance. For example, the controller 11 permits an output of voice in the conversation group on the user terminal 3d of the user D, who is a user not included in the conversation group including the users A, B, and C, and who is associated with a user icon whose distance from the conversation group is less than a predetermined distance.

In step S9, the controller 11 determines whether the conversation group has been cancelled. For example, in a case where one or more users in the conversation group have performed an operation of canceling the conversation group, the controller 11 cancels the conversation group. When the controller 11 cancels the conversation group (S9: Yes), the controller 11 shifts the processing to step S10. The controller 11 waits until the conversation group is cancelled (S9: No). Note that, in a case where the conversion group is cancelled, the controller 11 cancels prohibition of voice output. For example, in a case where a conversation group of the users A, B, and C is cancelled, the controller 11 permits output of voice of the other user such as the user D on the user terminals 3a, 3b, and 3c.

In step S10, the controller 11 determines whether the conversation has finished. For example, when a login user finishes the online meeting by finishing the conversation application on his/her user terminal 3, each controller of the management server 1, the conversation server 2, and the user terminal 3 finishes the conversation processing. When each controller of the management server 1, the conversation server 2, and the user terminal 3 finishes the conversation processing (S10:Yes), the conversation control processing is finished. Each controller repeatedly executes the above processing (steps S3 to S9) until the conversation processing is finished. In this way, the conversation system 100 executes the conversation control processing.

As described above, the conversation system 100 according to the present embodiment sets up a conversation group including a plurality of users in a virtual space, and restricts an output of voice which is outside the conversation group to the users in the conversation group. Specifically, the conversation system 100 permits an output of voice in the conversation group on the user terminal 3 of each of the plurality of users included in the conversation group, while prohibiting an output of voice which is outside the conversation group on each user terminal 3.

According to the above configuration, since voice which is outside the conversation group is not output to the conversation group, a plurality of users in the conversation group can smoothly make conversation. For example, as illustrated in FIG. 8, in a case where a conversation group including the user A, the user B, and the user C is set up, the user A, the user B, and the user C can converse with one another, and speech sounds of the user D and the user E outside the conversation group are not output to the conversation group. Therefore, the user A, the user B, and the user C can concentrate on conversation.

The conversation system 100 also permits an output of voice in the conversation group on the user terminal 3 of a user who is not included in the conversation group, and who is associated with a user icon whose distance from the conversation group in the virtual space is less than a predetermined distance.

According to the above configuration, for example, the user D outside the conversation group can hear speech sounds of the users A, B, and C in the conversation group on the user terminal 3d. This makes it easy for the user D to participate in the conversation of the users A, B, and C.

The present disclosure is not limited to the embodiment described above. As another embodiment, in a case where a user who is not included in a conversation group, and who is associated with a user icon whose distance from the conversation group is less than a predetermined distance is currently in conversation with another user who is outside the conversation group, the restriction processing unit 114 may prohibit an output of voice in the conversation group on the user terminal 3 of the user.

For example, as illustrated in FIG. 9, in a case where a user icon of the user D, who is not included in a conversation group including the user A, the user B, and the user C, is less than a predetermined distance from the conversation group, and the user D is currently in conversation with the user E outside the conversation group, the restriction processing unit 114 prohibits an output of voice in the conversation group on the user terminal 3d of the user D. This allows, for example, the user D and the user E to concentrate on conversation, because speech sounds of the user A, the user B, and the user C in the conversation group are not output outside the conversation group. Note that, in a case where microphone and speaker settings of the user terminal 3*d* of the user D are in an "ON" state, the restriction processing unit 114 may determine that the user D is currently in conversation, and prohibit an output of voice in the conversation group on the user terminal 3*d* of the user D.

Further, as another embodiment, in a case where the setting processing unit 113 sets up a first conversation group and a second conversation group, the restriction processing unit 114 may restrict an output of voice in the first conversation group to a user in the second conversation group, and also restrict an output of voice in the second conversation group to a user in the first conversation group.

Figure 11:
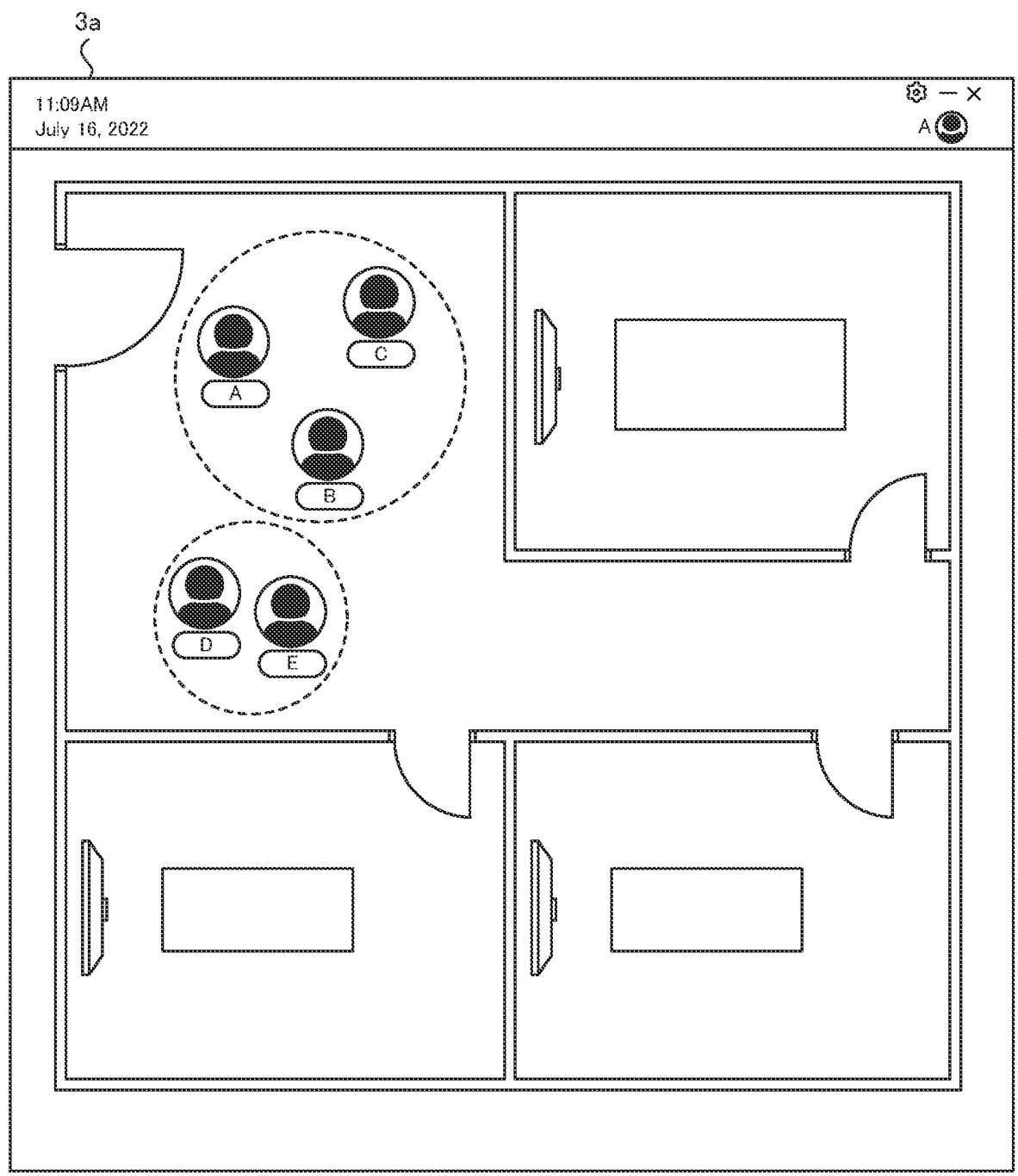
FIG. 11 is a diagram illustrating an example of a conversation screen to be displayed on the user terminal according to the embodiment of the present disclosure.

For example, as illustrated in FIG. 11, the setting processing unit 113 sets up a first conversation group including the user A, the user B, and the user C, and a second conversation group including the user D and the user E. In this case, the restriction processing unit 114 prohibits an output of voice in the first conversation group to the user D and the user E in the second conversation group, and prohibits an output of voice in the second conversation group to the user A, the user B, and the user C in the first conversation group. This allows each conversation group to concentrate on conversation since voice in the other conversation group does not become disturbance.

Note that, the restriction processing unit 114 may output voice in the first conversation group to the user D and the user E in the second conversation group at a reduced volume. Also, in a case where the user D or the user E requests blocking of voice in the first conversation group, the restriction processing unit 114 may prohibit an output of voice in the first conversation group to the user D and the user E. Note that, the controller 11 may automatically permit (resume) voice output, in a case where a conversation group is cancelled after voice output is prohibited in response to a request of blocking voice.

As another embodiment, in a case where a plurality of conversation groups are set up as illustrated in FIG. 11, a user who is outside a conversation group can hear voice of the conversation group by moving the user icon to a position less than a predetermined distance from a desired conversation group. The user may also perform an operation of moving the user icon into a conversation group, in a case where the user wishes to participate in one of the conversation groups. In this case, the setting processing unit 113 may add the user who wishes to participate in the conversation group, in a case where a user included in the conversation group as a moving destination of the user icon is permitted to do so. Also, the restriction processing unit 114 may determine a conversation group from which voice output to an external user is prohibited, based on a selection operation of the external user who does not belong to the first conversation group and the second conversation group in FIG. 11. For example, an external user can prohibit (request blocking of) voice output from both of the first and second conversation groups, or prohibit (request blocking of) voice output from one of the first and second conversation groups. The controller 11 may also automatically permit (resume) voice output, in a case where a conversation group is cancelled after voice output is prohibited in response to a request of blocking voice by an external user. For example, in a case where the first conversation group is cancelled after an external user prohibits voice output from both of the first and second conversation groups, the controller 11 permits (resumes) voice output from the first conversation group.

This allows the external user to respond to a call from the users (users A, B, and C) in the first conversation group.

Figure 12:
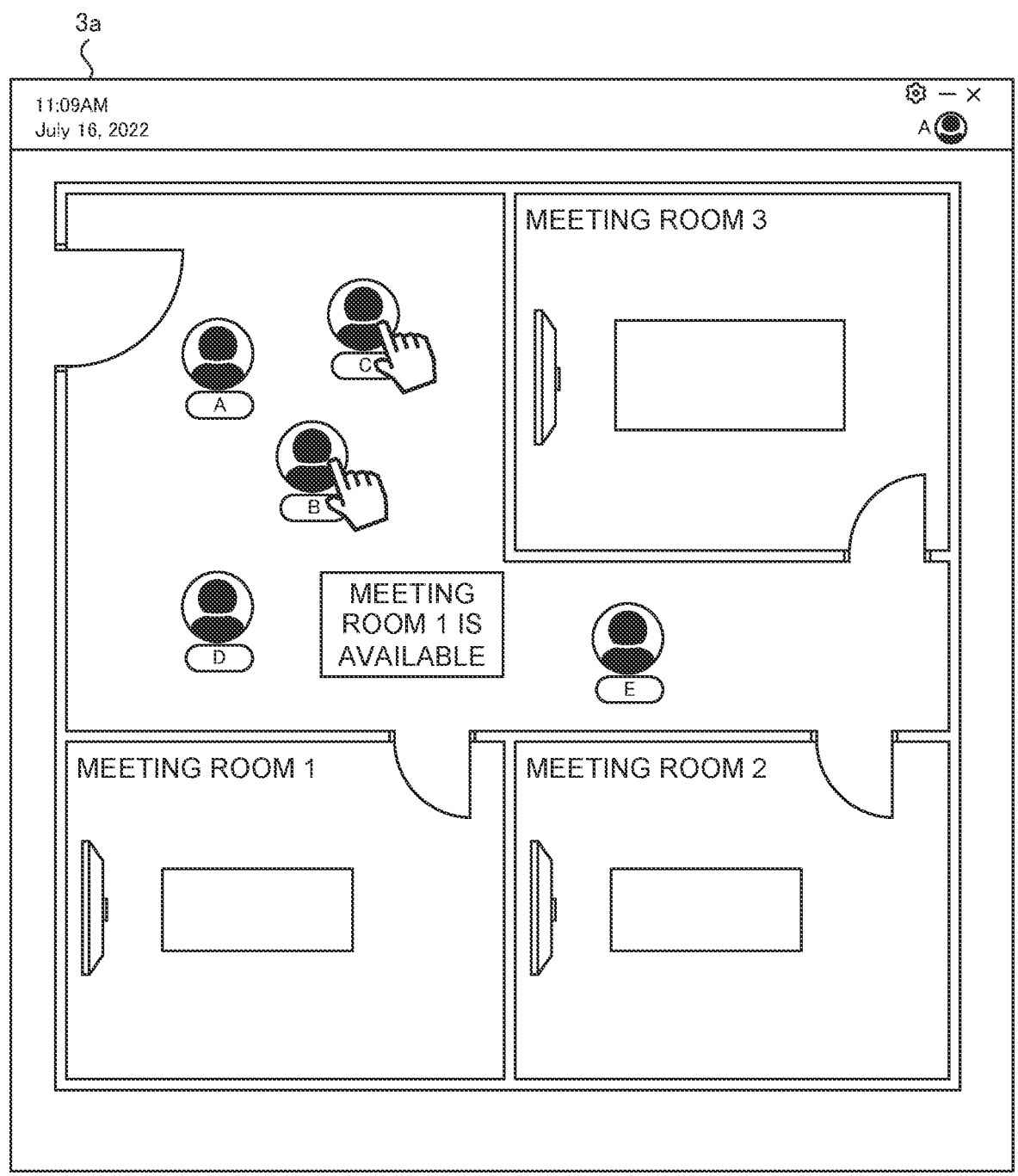
FIG. 12 is a diagram illustrating an example of a conversation screen to be displayed on the user terminal according to the embodiment of the present disclosure.
Figure 13:
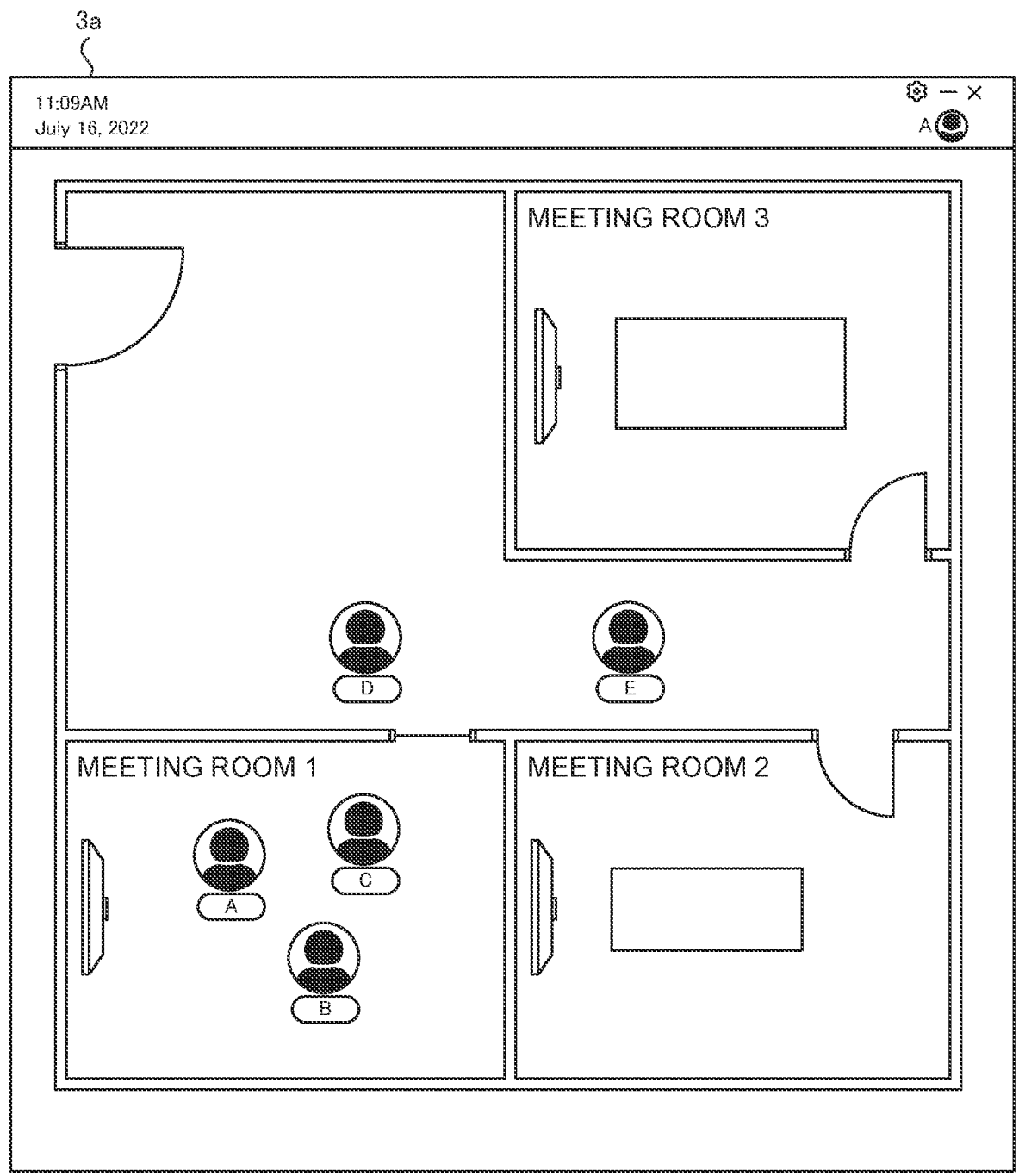
FIG. 13 is a diagram illustrating an example of a conversation screen to be displayed on the user terminal according to the embodiment of the present disclosure.

As another embodiment, the controller 11 may prompt the user to move the user icon to a specific area (e.g., a virtual meeting room) where external voice is blocked. For example, as illustrated in FIG. 12, in a case where the user A selects the user icon of each of the user B and the user C on a conversation screen, the setting processing unit 113 displays a message indicating that the meeting room 1 in the virtual space is available. The user A moves the user icon of each of the user A, the user B, and the user C to the meeting room 1 in response to the message (see FIG. 13).

Note that, a meeting room in a virtual space may be associated with a meeting room in the real space. For example, in a case where the user A is seated near a meeting room in an office, and makes conversation by making a conversation group with the user B and the user C in a remote place, the controller 11 may prompt the user A to move to an actual meeting room in the office. Also, in a case where the user A moves to the meeting room in the office, the controller 11 may automatically move the user icon of the user A to the meeting room in the virtual space. Note that, the controller 11 can determine a positional relationship between a user's seat position in the real space, and the meeting room by registering position information on the meeting room, a seat, a user terminal 3, and the like in the real space in association with the virtual space. Further, for example, in a case where the user A is seated in an office, and makes conversation by making a conversation group with the user B and the user C in a remote place, and the user D is also seated in the office and makes conversation by making a conversation group with the user E in a remote place, in a case where an actual distance of the user A and the user D is less than a predetermined distance, the controller 11 may prompt the user who is closer to the meeting room between the user A and the user D to move to the actual meeting room in the office. In this case, the controller 11 can, for example, transmit and receive voice by the microphone and the speaker of the user terminal 3*a* of the user A and the microphone and the speaker of the user terminal 3*d* of the user D, estimate a distance of the user terminal 3*a* and the user terminal 3*d*, based on an arrival time or a volume of voice data, and estimate an actual distance of the user A and the user D. The controller 11 can also suggest the user A to move to the meeting room, based on loudness of voice of another user or an environmental sound to be input to the microphone of the user terminal 3*a* of the user A immediately before the conversation group is made, a distance to a user in another conversation group in the real space, or the like. According to the above configuration, for example, a user in the office can concentrate on conversation of the conversation group, because the user is not disturbed by conversation of another user in the office in the real space.

In this case, the setting processing unit 113 sets up a conversation group including the user A, the user B, and the user C associated with user icons that have been moved to the meeting room 1. The restriction processing unit 114 prohibits an output of voice which is outside the meeting room 1 to the users in the meeting room 1. This allows the user A, the user B, and the user C to concentrate on conversation, because speech sounds of the user D and the user E outside the meeting room 1 are not output to the meeting room 1.

The restriction processing unit 114 may also permit an output of voice in the meeting room 1 to a user having a user icon whose distance from the meeting room 1 is less than a predetermined distance. This makes it easy for the user D having the user icon near the meeting room 1 to participate in conversation in the meeting room 1, because the user D can hear the conversation in the meeting room 1.

As another embodiment, the controller 11 may control voice in such a way that voices of all users in the same virtual space can hear. For example, in a case where user icons of the users A to E are in the same virtual space, the controller 11 may permit voice output in such a way that each of the users A to E can converse with one another. Further, as another embodiment, the controller 11 may be able to set up a conversation group, in a case where the user icons are located away from one another. Specifically, the controller 11 may add a user selected from a user list associated with a second virtual space to a conversation group set in a first virtual space. This enables to set up a conversation group by selecting, for example, a user on a floor F1 associated with the first virtual space, and a user on a floor F2 associated with the second virtual space. In this way, the controller 11 can also be configured to set up a conversation group by selecting any user icon, independently of a distance between user icons.

The voice control system according to the present disclosure may be constituted of the management server 1, the conversation server 2, and the user terminal 3, as illustrated in FIG. 2, or may be constituted of the management server 1 alone, or may be constituted of the user terminal 3 alone.

SUPPLEMENTARY NOTES OF DISCLOSURE

Hereinafter, an overview of the disclosure to be extracted from the embodiment described above is described as supplementary notes. Note that, each configuration and each processing function to be described in the following supplementary notes can be selected and combined as necessary.

Supplementary Note 1

A voice control system including:
a setting processing unit that sets up a conversation group including a plurality of users in a virtual space; and
a restriction processing unit that restricts an output of voice which is outside the conversation group to be set by the setting processing unit to a user in the conversation group.

Supplementary Note 2

The voice control system according to supplementary note 1, wherein
the restriction processing unit permits an output of voice in the conversation group on a user terminal of each of the plurality of users included in the conversation group, while prohibiting an output of voice which is outside the conversation group on each of the user terminals.

Supplementary Note 3

The voice control system according to supplementary note 1 or 2, further including
an acquisition processing unit that acquires a distance between user icons to be displayed in the virtual space, wherein
the restriction processing unit permits an output of voice in the conversation group on a user terminal of a user who is not included in the conversation group, and who is associated with a user icon whose distance from the conversation group in the virtual space is less than a predetermined distance.

Supplementary Note 4

The voice control system according to any one of supplementary notes 1 to 3, wherein
in a case where a distance of each of a plurality of user icons associated with a plurality of users is less than a predetermined distance, and a request operation of requesting grouping is accepted from at least one of the plurality of users, the setting processing unit sets up the conversation group including the plurality of users.

Supplementary Note 5

The voice control system according to supplementary note 4, further including
a display processing unit that displays an input screen for inputting the request operation, in a case where an operation of selecting one or more user icons is accepted from a first user among a plurality of users, wherein
the setting processing unit sets up the conversation group including the first user, and a plurality of users associated with the plurality of user icons, in a case where an operation of inputting the request operation is accepted from the first user on the input screen.

Supplementary Note 6

The voice control system according to any one of supplementary notes 1 to 5, wherein
in a case where a distance of each of a plurality of user icons associated with a plurality of users is less than a predetermined distance, and attribute information of each of the plurality of users satisfies a predetermined condition, the setting processing unit sets up the conversation group including the plurality of users.

Supplementary Note 7

The voice control system according to supplementary note 6, wherein
the attribute information includes at least one of a conversation status of a user, schedule information of a user, and setting information on a microphone and a speaker of a user terminal.

Supplementary Note 8

The voice control system according to any one of supplementary notes 1 to 7, wherein
in a case where a user who is not included in the conversation group, and who is associated with a user icon whose distance from the conversation group is less than a predetermined distance is currently in conversation with another user who is outside the conversation group, the restriction processing unit prohibits an output of voice in the conversation group on a user terminal of the user.

Supplementary Note 9

The voice control system according to any one of supplementary notes 1 to 8, wherein in a case where the setting processing unit sets up a first conversation group and a second conversation group, the restriction processing unit restricts an output of voice in the first conversation group to a user in the second conversation group, and restricts an output of voice in the second conversation group to a user in the first conversation group.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A voice control system comprising:
one or more processors; and
a memory coupled to the one or more processors and storing one or more computer executable instructions, when executed by the one or more processors, cause the system to:
set up a conversation group including a plurality of users in a virtual space, in a case that a distance between each of a plurality of user icons is less than a predetermined distance and attribute information of each of the plurality of users satisfies a predetermined condition; and
restrict an output of voice, which is from outside the conversation group, to a user in the conversation group, wherein
when a user, who is not included in the conversation group and who is associated with a user icon having a distance from the conversation group that is less than a predetermined distance, is currently in conversation with another user who is outside the conversation group, the one or more computer-executable instructions, when executed by the one or more processors, further cause the system to prohibit an output of voice, from within the conversation group, on a user terminal of the user who is not included in the conversation group.

2. The voice control system according to claim 1, wherein the one or more computer-executable instructions, when executed by the one or more processors, further cause the system to:
permit an output of voice, from within the conversation group, on a user terminal of each of the plurality of users included in the conversation group, while prohibit the output of voice, which is from outside the conversation group, on the user terminal of each of the plurality of users.

3. The voice control system according to claim 1, wherein the one or more computer executable instructions, when executed by the one or more processors, further cause the system to:
acquire the distance from the plurality of user icons to be displayed in the virtual space; and
permit an output of voice, from within the conversation group, on a user terminal of a user who is not included in the conversation group and who is associated with a user icon having a distance from the conversation group in the virtual space that is less than the predetermined distance.

4. The voice control system according to claim 1, wherein when the distance of each of the plurality of user icons is less than the predetermined distance, and a request operation of requesting grouping is accepted from at least one of the plurality of users, the one or more computer-executable instructions, when executed by the one or more processors, further cause the system to set up the conversation group including the plurality of users.

5. The voice control system according to claim 4, wherein the one or more computer-executable instructions, when executed by the one or more processors, further cause the system to:
display an input screen for inputting the request operation, when an operation of selecting one or more user icons, among the plurality of user icons, is accepted from a first user among the plurality of users; and
set up the conversation group including the first user and the plurality of users, when an operation of inputting the request operation is accepted from the first user on the input screen.

6. The voice control system according to claim 1, wherein when the distance of each of the plurality of user icons is less than the predetermined distance, and attribute information of each of the plurality of users satisfies a predetermined condition, the one or more computer-executable instructions, when executed by the one or more processors, further cause the system to set up the conversation group including the plurality of users.

7. The voice control system according to claim 6, wherein the attribute information includes at least one of a conversation status of a user, schedule information of a user, and setting information on a microphone and a speaker of a user terminal.

8. The voice control system according to claim 1, wherein when the one or more computer-executable instructions, when executed by the one or more processors, further cause the system to set up a first conversation group and a second conversation group, the one or more computer-executable instructions, when executed by the one or more processors, further cause the system to restrict an output of voice, from within the first conversation group, to a user in the second conversation group, and restrict an output of voice, from within the second conversation group, to a user in the first conversation group.

9. A voice control method comprising:
setting up a conversation group including a plurality of users in a virtual space, in a case that a distance between each of a plurality of user icons is less than a predetermined distance and attribute information of each of the plurality of users satisfies a predetermined condition; and
restrict an output of voice, which is from outside the conversation group, to a user in the conversation group, wherein
when a user, who is not included in the conversation group and who is associated with a user icon having a distance from the conversation group that is less than a predetermined distance, is currently in conversation with another user who is outside the conversation group, the one or more computer-executable instructions, when executed by the one or more processors, further cause the system to prohibit an output of voice, from within the conversation group, on a user terminal of the user who is not included in the conversation group.

10. A non-transitory computer-readable recording medium recording one or more computer-executable voice control instructions, when executed by one or more processors, cause the one or more processors to:

set up a conversation group including a plurality of users in a virtual space, in a case that a distance between each of a plurality of user icons is less than a predetermined distance and attribute information of each of the plurality of users satisfies a predetermined condition; and restrict an output of voice, which is from outside the conversation group, to a user in the conversation group, wherein when a user, who is not included in the conversation group and who is associated with a user icon having a distance from the conversation group that is less than a predetermined distance, is currently in conversation with another user who is outside the conversation group, the one or more computer-executable instructions. when executed by the one or more processors, further cause the system to prohibit an output of voice, from within the conversation group, on a user terminal of the user who is not included in the conversation group.

* * * * *